United States Patent
You

(10) Patent No.: US 9,179,368 B2
(45) Date of Patent: Nov. 3, 2015

(54) METHOD AND POLICY ENFORCEMENT FUNCTIONAL ENTITY FOR IMPLEMENTING QUALITY OF SERVICE REQUEST INFORMATION

(75) Inventor: Jianjie You, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/059,739

(22) PCT Filed: Jun. 10, 2009

(86) PCT No.: PCT/CN2009/072202
§ 371 (c)(1),
(2), (4) Date: Feb. 18, 2011

(87) PCT Pub. No.: WO2010/022610
PCT Pub. Date: Mar. 4, 2010

(65) Prior Publication Data
US 2011/0145389 A1    Jun. 16, 2011

(30) Foreign Application Priority Data
Sep. 1, 2008    (CN) .......................... 2008 1 0213730

(51) Int. Cl.
*G06F 15/173* (2006.01)
*H04W 28/24* (2009.01)
(Continued)

(52) U.S. Cl.
CPC ........... *H04W 28/24* (2013.01); *H04L 12/5695* (2013.01); *H04L 47/20* (2013.01); *H04L 47/35* (2013.01); *H04L 47/782* (2013.01); *H04L 65/80* (2013.01)

(58) Field of Classification Search
CPC ... H04L 12/5695; H04L 47/782; H04L 65/80; H04L 47/824; H04L 47/805; H04L 41/0896; H04L 41/5003

USPC .......................................... 709/223–224, 203
See application file for complete search history.

(56) References Cited

U.S. PATENT DOCUMENTS 7,881,317 B2 *  2/2011  Lin ............................... 370/401
8,972,553 B2 *  3/2015  Jin et al. ........................ 709/223
(Continued)

FOREIGN PATENT DOCUMENTS

CN    101222413 A    7/2008
CN    101232503 A    7/2008
(Continued)

OTHER PUBLICATIONS

Telecommunication Standardization Sector of ITU, Resource control protocol No. 3-Protocol at the Rw interface between a policy decision physical entity (PD-PE) and a policy enforcement physical entity (PE-PE): Diamete, ITU-T Q.3303.3, May 2008, Sections 6.2.1 to section 7.4.8, pp. 14-46.*

(Continued)

*Primary Examiner* — Duyen Doan
(74) *Attorney, Agent, or Firm* — Oppedahl Patent Law Firm LLC

(57) ABSTRACT

The present invention discloses a method and policy enforcement functional entity (PE-FE) for implementing quality of service (QoS) request information. The method comprises the following steps: a PE-FE sends a policy decision functional entity (PD-FE) a QoS request message including predetermined parameters which are used to represent the QoS request information of the transport layer. The technical solutions mentioned above enable the QoS request information of the transport layer to be accurately represented, and implement the resource request process in the pull mode.

8 Claims, 6 Drawing Sheets

(51) Int. Cl.
  *H04L 12/54* (2013.01)
  *H04L 12/813* (2013.01)
  *H04L 12/801* (2013.01)
  *H04L 12/911* (2013.01)
  *H04L 29/06* (2006.01)

(56) References Cited

U.S. PATENT DOCUMENTS

| | | | |
|---|---|---|---|
| 2004/0205193 A1* | 10/2004 | Hurtta et al. | 709/227 |
| 2007/0201366 A1* | 8/2007 | Liu | 370/235 |
| 2008/0013533 A1* | 1/2008 | Bogineni et al. | 370/389 |
| 2008/0119181 A1* | 5/2008 | Suzuki et al. | 455/422.1 |
| 2008/0256237 A1* | 10/2008 | Liu | 709/226 |
| 2008/0307081 A1* | 12/2008 | Dobbins et al. | 709/223 |
| 2009/0076952 A1* | 3/2009 | Cadenas et al. | 705/40 |
| 2009/0190471 A1* | 7/2009 | Mahendran et al. | 370/230.1 |
| 2010/0017846 A1* | 1/2010 | Huang et al. | 726/1 |
| 2011/0208853 A1* | 8/2011 | Castro-Castro et al. | 709/223 |
| 2011/0317718 A1* | 12/2011 | Siddam et al. | 370/468 |
| 2012/0005356 A1* | 1/2012 | Hellgren | 709/229 |

FOREIGN PATENT DOCUMENTS

| | | |
|---|---|---|
| CN | 101360113 A | 2/2009 |
| EP | 2086171 A1 | 8/2009 |
| WO | 2008083558 A1 | 7/2008 |

OTHER PUBLICATIONS

Hakala et al, Diameter Credit-Control Application, Aug. 2005, Network Working Group, Request for Comments: 4006, 1-75.*

International Search Report on international application No. PCT/CN2009/072202, mailed on Sep. 17, 2009.

English Translation of the Written Opinion of the International Search Authority in international application No. PCT/CN2009/072202, mailed on Sep. 17, 2009.

Notification of the First Office Action of Chinese application No. 200810213730.4, issued on Jun. 7, 2011.

D.Sun, Diameter Policy Enforcement Inferface:ITU-T Rw draft-sun-dime-itu-t-rw-oo.txt, Feb. 17, 2008 , the whole document.

3GPP TSG CT, Policy and Charging Control over Gx reference point (release 8), 3GPP TS 29.212 V8.0.0 May 2008, the whole document.

Telecommunication Standardization Sector of ITU, Resource control protocol No. 3-Protocols at Rw interface between a policy decision physical entity(PD-PE) and a policy enforcement physical entity (PE-PE):Diameter, ITU-T 0.3303.3 , May 2008 section 6.2.1.6, 7.3.3.24 ,7.4.3 and 7.4.4.

Supplementary European Search Report in European application No. 09809195.2, mailed on Jan. 14, 2014.

Durham et al, The COPS (Common Open Policy Service), Protocol. Network Working Group. Internet Engineering Task Force, Jan. 2000, pp. 1-38.†

\* cited by examiner
† cited by third party

METHOD AND POLICY ENFORCEMENT FUNCTIONAL ENTITY FOR IMPLEMENTING QUALITY OF SERVICE REQUEST INFORMATION

CROSS-REFERENCE TO RELATED APPLICATIONS

This application is the U.S. National Stage of International Patent Application No. PCT/CN2009/072202 filed on Jun. 10, 2009, which claims priority to Chinese Patent Application Number 200810213730.4 filed on Sep. 1, 2008 the disclosures of which are hereby incorporated by reference in their entirety.

TECHNICAL FIELD

The present invention relates to the field of communications, and more specifically to a method and a policy enforcement functional entity (PE-FE) for implementing Quality of Service (QoS) request information.

BACKGROUND

As a hot-spot research subject in today's communication standardization field, NGN adopts IP packet technology as the carrier network technology and combines fixed communication technology and mobile communication technology. NGN can provide more abundant multimedia services, such as emerging services with real-time requirement (e.g. IP TV, video conferencing, multimedia remote teaching and video-on-demand), these services require the communication network to provide highly efficient end-to-end Quality of Service (QoS) support, and meanwhile the customer has increasingly higher requirements on network service quality. Therefore, how to provide end-to-end QoS support may be one of the core issues of NGN.

The International Telecommunication Union-Telecommunications Standardization Sector (ITU-T), as the telecommunications unit of the International Telecommunication Union (ITU), has developed a standard regarding resource and admission control. The latest draft of Resource and Admission Control Functions (RACF) issued by ITU-T provides a RACF-specific functional framework as shown in FIG. 1, which is a functional architecture diagram of RACF in pertinent prior art. The RACF comprises two parts, which are, respectively, a Policy Decision Functional Entity (PD-FE) and a Transport Resource Control Functional Entity (TRC-FE). The TRC-FE interacts with the transport function via Rc interface and interacts with the Transport Resource Enforcement Functional Entity (TRE-FE) via Rn interface. Moreover, the PD-FE interacts with the TRC-FE via Rt interface, interacts with the Customer Premises Network (CPN) via Rh interface, interacts with the Service layer's Service Control Functions (SCF) via Rs interface, and interacts with the Network Attachment Control Functions (NACF) via Ru interface. The PD-FE interacts with other Next Generation Networks via Ri interface.

In addition, the PD-FE is dependent of neither the transmission technology nor the SCF. The PD-FE makes the final decision for resource and admission control on the basis of network policy rules, service information provided by the SCF, transport layer subscription information provided by the NACF, and the result of resource availability decision provided by the TRC-FE.

The TRC-FE is independent of services, but is dependent on the transmission technology. The TRC-FE is responsible for collecting and maintaining the transmission network information and resource status information. After receiving a resource request from the PD-FE, the TRC-FE enforces resource-based admission and control on the basis of QoS, priority requirement, resource availability information and transmission-related policy rules.

The transport layer comprises a Policy Enforcement Functional Entity (PE-FE) and a Transport Resource Enforcement Functional Entity (TRE-FE). The PE-FE is a packet-to-packet gateway, which may be located between a Customer Premises Network (CPN) and an access network, between an access network and a core network, or between networks of different operators, and is the key node which supports dynamic QoS control, port address translation control and Network Address Translator (NAT) crossing. The TRE-FE enforces the transport resource policy rules sent down by the TRC-FE. The scope, function and the Rn interface of the TRE-FE, which need further research, are not the research object of R2 stage.

FIG. 2 shows a resource request process in the pull mode in prior art. As shown in FIG. 2, the resource request process comprises the following steps:

Step S202, A transport layer signaling from the Customer Premises Equipment (CPE) triggers the PE-FE to generate a resource decision request so as to reserve required QoS resources for the specified flow.

Step S204, After receiving a QoS request from the CPE, the PE-FE sends the PD-FE a resource decision request message via the Rw interface to request the PD-FE to make an admission control decision. The resource decision request message comprises flow description and QoS parameter information.

Step S206, If the SCF has provided QoS pre-authorization to the related flow, the PD-FE, after receiving the resource decision request message from the PE-FE, interacts with the SCF so as to obtain the service information of related flow. Step S206 is optional.

Step S208, The PD-FE checks the flow description, the requested QoS resource and the service information to see if they are consistent with the network policy rules in the PD-FE and with the transport layer subscription information in the NACF.

Step S210, Under the condition that the check in Step S208 has passed, the PD-FE determines the access network and the core network required by media flow and interacts with the TRC-FE to check the availability of resources.

Step S212, After Step S208 and Step S210, the PD-FE makes a final admission decision.

Step S214, The PD-FE sends a resource decision response message to the PE-FE, and the message contains the final decision rules. Then, the PE-FE performs policy installation and replies to the CPE through the transport layer signaling.

It has been seen from the above mentioned process that in existing Rw interface protocol, the CCR command can be used for the PE-FE to send a resource decision request message to the PD-FE in the pull mode (i.e. Step S204). However, the CCR command provides no clear definition about how to include the flow description and QoS parameter information, and, in the pull mode, in addition to the flow description and QoS parameter information, it is also required to include other information such as flow status, user name, IP address, logical access ID, and physical access ID, etc. Unfortunately, these are not yet defined in the existing Rw interface protocol.

In pertinent prior art, although the resource request process in the pull mode is given, the QoS request information from the transport layer has not been accurately represented. Therefore, it is still problematic in actually implementing the above mentioned process.

SUMMARY

The present invention is provided in consideration of the issue that the QoS request information from the transport layer has not been accurately represented in the pull mode, therefore, the present invention is mainly intended to provide a method and a policy enforcement functional entity for implementing quality of service request information so as to resolve at least one of the above mentioned problems existing in pertinent prior art.

In one aspect of the present invention, a method for implementing quality of service request information is herein provided, which is used to implement the QoS request information of the transport layer in the pull mode.

According to the present invention, the method for implementing QoS request information comprises the following steps: a PE-FE sends a PD-FE a QoS request message including predetermined parameters; wherein the predetermined parameters are used to represent the QoS request information of the transport layer.

Further, the predetermined parameters are applied to an Rw interface of a resource and admission control function and are included in a CCR command of the Rw interface.

In addition, the CCR command further includes one or more the predetermined parameters.

Further, the predetermined parameters include at least one of the following information: flow description information, flow status information, quality of service information, user name information, Layer 2 address information, IP address information, logical access address information, and physical access address information.

Furthermore, the predetermined parameters further include one or more pieces of flow description information.

In another aspect of the present invention, a policy enforcement functional entity (PE-FE) is provided.

According to the present invention, the PE-FE comprises a transmitting module which is used to send a PD-FE a QoS request message including predetermined parameters.

Further, the predetermined parameters are applied to an Rw interface of a resource and admission control function and are included in a CCR command of the Rw interface.

Furthermore, the CCR command further includes one or more the predetermined parameters.

Further, the predetermined parameters include at least one of the following information: flow description information, flow status information, quality of service information, user name information, Layer 2 address information, IP address information, logical access address information, and physical access address information.

The technical solution of the present invention can be used to, by defining new parameters, allow the QoS request information to be accurately represented so as to implement the resource request process in the pull mode.

Other characteristics and advantages of the prevent invention will be discussed in the following, and will become obvious partly via the instructions or become understood via the embodiments of the present invention. The purpose and other advantages of the present invention can be achieved and acquired through the specification, claims and the structure specially illustrated in the drawings.

BRIEF DESCRIPTION OF DRAWINGS

The drawings are used to provide further understanding about the present invention, constitute a part of the description, are used together with the embodiments of the present invention to explain the present invention, and do not constitute any limitation on the present invention. Among the drawings.

DETAILED DESCRIPTION

Functional Overview

Figure 1:
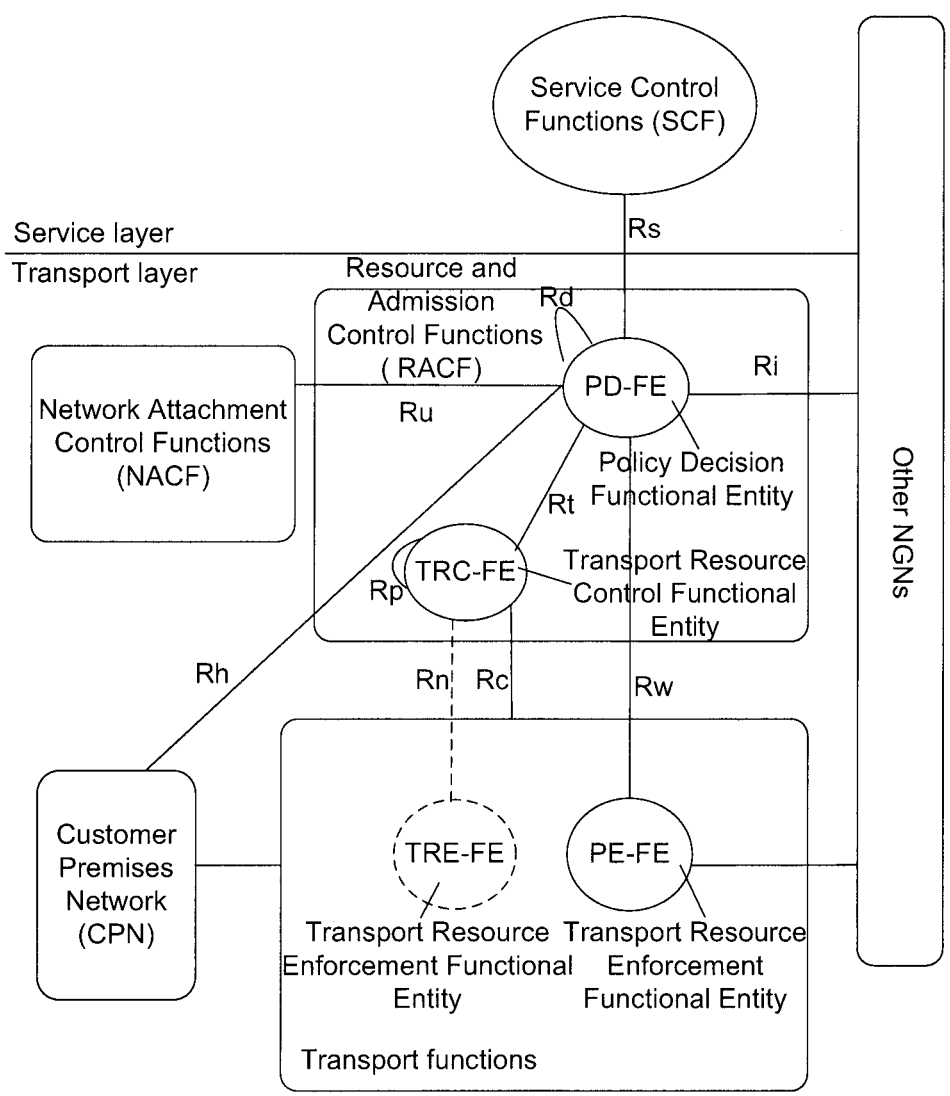
FIG. 1 is a functional architecture diagram of the RACF in pertinent prior art.
Figure 2:
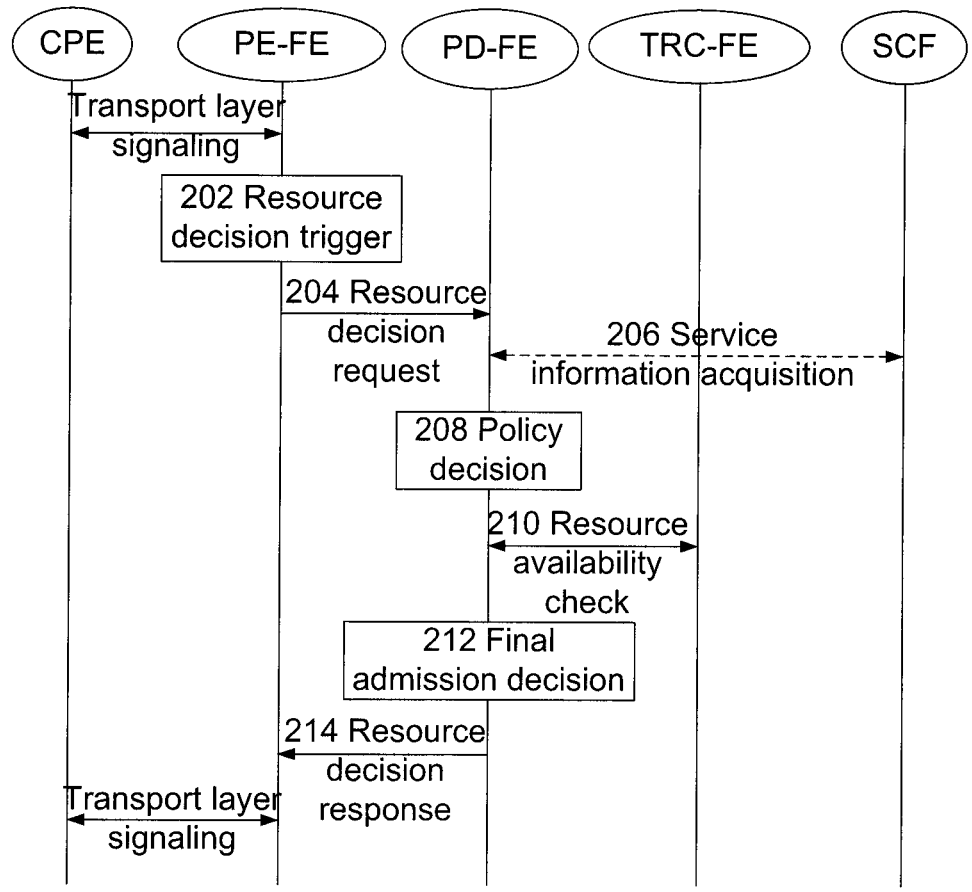
FIG. 2 is a signaling flowchart of the resource request process in the pull mode in pertinent prior art.

The latest draft of Resource and Admission Control Functions issued by the ITU-T provides a RACF-specific functional framework as shown in FIG. 1, where the RACF comprises a PD-FE and a TRC-FE. The major functional entities in FIG. 1 are explained in detail below.

As the Policy Decision Functional Entity, the PD-FE makes a preliminary QoS resource decision based on media flow session information and customer transport resource subscription information, where the media flow session information is acquired from SCF via Rs interface and the customer transport resource subscription information is acquired from NACF via the Ru interface. Then, the PD-FE interacts with the TRC-FE to confirm whether there are sufficient QoS resources, and finally makes a final admission decision and sends down the decision to the PE-FE for enforcement.

The TRC-FE is mainly responsible for resource control, which monitors the resources in the network and collects related information, and responds according to the specific resource conditions when the PD-FE requests resources.

The PE-FE primarily performs policy control under the direction of the PD-FE, such as gating, bandwidth, traffic classification and tagging, traffic shaping, QoS mapping of Layer 2 and Layer 3, and collecting and reporting resource utilization information, etc.

The existing TRE-FE protocol performs Layer 2 policy enforcement under the direction of the TRC-FE, but neither its specific function nor its scope has been determined.

In pertinent prior art, it is the PE-FE that sends the resource decision request message to the PD-FE. However, the CCR command in the existing Rw interface protocol lacks a parameter that can accurately represent the QoS request information from the transport layer in the pull mode. For the problem, the present invention has defined a new parameter in the CCR command which is used to describe transport layer's QoS request information.

The preferred embodiments of the present invention are described below in conjunction with the accompanying drawings. It should be understood that the preferred embodiments described here are used to only describe and explain the present invention rather than limit the present invention.

Device Embodiment

Figure 3:
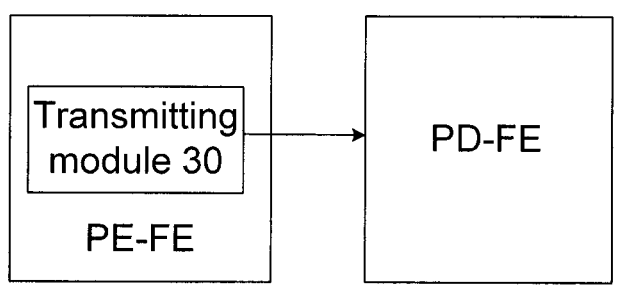
FIG. 3 is a block diagram of the policy enforcement functional entity according to the embodiments of the present invention.

A policy enforcement functional entity (PE-FE) is provided according to the embodiments of the present invention. FIG. 3 shows a block diagram of the policy enforcement functional entity according to the embodiments of the present invention. As shown in FIG. 3, the PE-FE comprises a transmitting module 30 which is explained in details below.

The transmitting module 30 is used to send QoS request messages to the PD-FE, which include predetermined parameters. The predetermined parameters can be called the transport layer's QoS request information.

The predetermined parameters are applied to an Rw interface of a resource and admission control function. In practical applications, the predetermined parameters may be of either the AVP form or other forms, and, the predetermined parameters are included in a CCR command of the Rw interface and named as [Traffic-Information]. It is necessary to clarify that the name is not unique even though the [Traffic-Information] is used as their name in the present invention. Furthermore, the newly defined parameters in the CCR command have the following form:

```
<CC-Request> ::=   < Diameter Header : 272, REQ, PXY >
                   < Session -Id >
                   { Auth-Application -Id }
                   { Origin -Host }
                   { Origin -Realm }
                   { Destination -Realm }
                   { CC-Request -Type}
                   { CC-Request -Number }
                   *[Traffic -Information ] ——— Trans port layer's
                   QoS request information
                   ... ...
                   *[ AVP ]
```

For easy description, some of the existing AVPs in the CCR command have been omitted, and, each item with a "*" symbol means that there can be multiple such items, i.e. there can be multiple new parameters named [Traffic-Information].

Wherein, the [Traffic-Information] AVP representing the transport layer's QoS request information is defined as the following form:

| Traffic-Information ::= <AVP Header: TBD> | | | |
|---|---|---|---|
| (Transmission layer's | * [Flow-Description] | ——— | Flow description |
| QoS request | [Flow-Status] | ——— | Flow status |
| information) | [QoS-Information] | ——— | QoS information |
| | [User-Name] | ——— | User Name |
| | [Called-Station-ID] | ——— | Layer 2 address |
| | [Framed-IP-Address] | | |
| | [Framed-IPv6-Prefix] | ⟩ | IP address |
| | [Address-Realm] | | |
| | [Logical-Access-Id] | ——— | Logical access address |
| | [Physical-Access-ID] | ——— | Physical access address |

It is seen from the form of the above mentioned new parameter named [Traffic-Information] that the new parameter named [Traffic-Information] includes at least one of the following information: flow description information, flow status information, quality of service information, user name information, Layer 2 address information, IP address information, logical access address information, and physical access address information. Moreover, all AVPs mentioned above have clear definition in prior art.

Through the above mentioned processing, the PE-FE defines a new parameter to represent transport layer's QoS request information when sending a QoS request message to the PD-FE which ensures the accurate implementation of processes in the pull mode, such as resource request process and resource modification process, etc.

Method Embodiment

Figure 4:
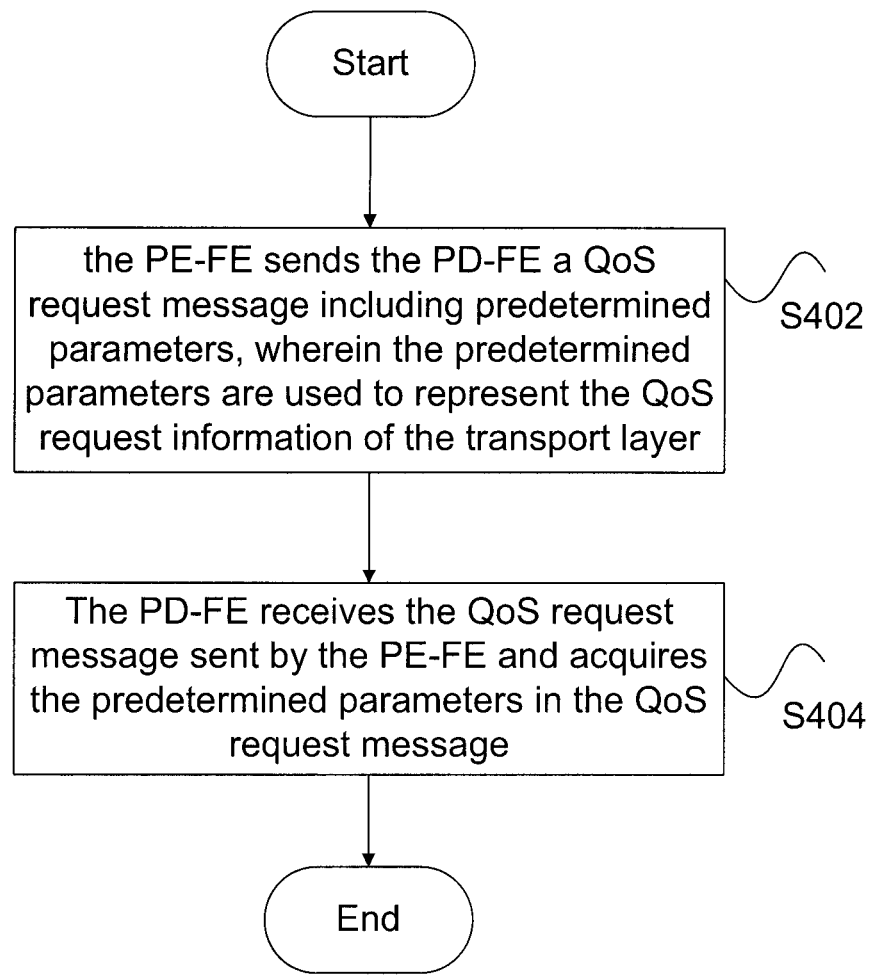
FIG. 4 is a flowchart of the method for implementing the QoS request information according to the embodiments of the present invention.

According to the embodiments of the present invention, a method for implementing quality of service request information is herein provided, which is used to implement the QoS request information of the transport layer in the pull mode. FIG. 4 is a flowchart of the method for implementing the QoS request information according to the embodiments of the present invention. As shown in FIG. 4, the implementation method comprises the following steps (i.e. Step S402-Step S404):

Step S402, The PE-FE sends the PD-FE a QoS request message including predetermined parameters, wherein the predetermined parameters are used to represent the QoS request information of the transport layer.

The predetermined parameters are applied to the Rw interface of the resource and admission control function and are included in the CCR command of the Rw interface. Furthermore, the CCR command can also include multiple predetermined parameters. In practical applications, the predetermined parameters may be of the AVP form, but is not limited to the AVP form.

In addition, the predetermined parameters include other information such as flow description information, flow status information, quality of service information, user name information, Layer 2 address information, IP address information, logical access address information, physical access address information, etc. Moreover, the predetermined parameter may include one or more pieces of flow description information.

Step S404, The PD-FE receives the QoS request message sent by the PE-FE and acquires the predetermined parameters in the QoS request message.

The technical solutions of the present invention are described in detail below on the basis of examples.

Example 1

Figure 5:
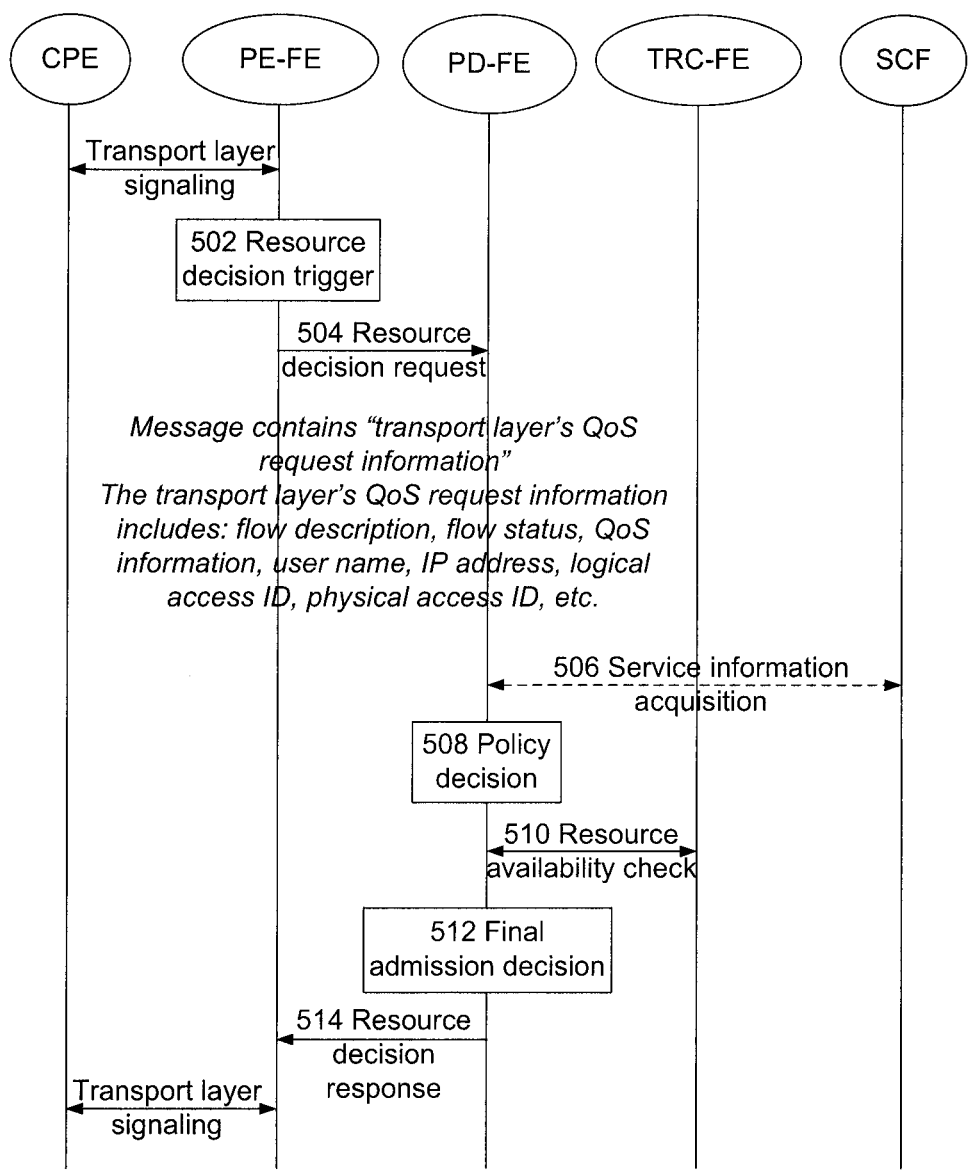
FIG. 5 is the signaling flowchart of Example 1 of the method for implementing the QoS request information according to the embodiments of the present invention.

FIG. 5 shows the resource request process in the pull mode according to the embodiment of the present invention. As shown in FIG. 5, the resource request process comprises the following steps (Step S502-Step S514):

Step S502, A transport layer signaling from the CPE triggers the PE-FE to generate a resource decision request so as to reserve the required QoS resources for the specified flow.

Step S504, After receiving a QoS request from the CPE, the PE-FE sends the PD-FE a resource decision request message via the Rw interface to request the PD-FE to make an admission control decision. The resource decision request message contains transport layer's QoS request information, i.e. the predetermined parameters mentioned above.

In existing Rw interface protocol, the CCR command can be used by the PE-FE to send resource decision request messages to the PD-FE in the pull mode. Therefore, the transport layer's QoS request information is included in the CCR command. Because the existing Rw interface protocol utilizes the Diameter protocol and object properties are represented in the form of AVP, the CCR command containing transport layer's QoS request information is represented in the following form:

```
<CC-Request> ::=    < Diameter Header : 272, REQ, PXY >
                    < Session -Id >
                    { Auth-Application -Id }
                    { Origin -Host }
                    { Origin -Realm }
                    { Destination -Realm }
                    { CC-Request -Type}
                    { CC-Request -Number }
                    *[Traffic -Information ] ———— Trans port layer's
                    QoS request information
                    ... ...
                    *[ AVP ]
```

For easy description, some of the existing AVPs in the CCR command have been omitted, and, each item with a "*" symbol means that there can be multiple such items. In the above mentioned CCR command, a new AVP is defined to represent transport layer's QoS request information and is named [Traffic-Information], whose AVP form is represented as:

| | | | |
|---|---|---|---|
| Traffic-Information ::= <AVP Header: TBD> | | | |
| (Transmission layer's | * [Flow-Description] | ———— | Flow description |
| QoS request | [Flow-Status] | ———— | Flow status |
| information) | [QoS-Information] | ———— | QoS information |
| | [User-Name] | ———— | User Name |
| | [Called-Station-ID] | ———— | Layer 2 address |
| | [Framed-IP-Address] | | |
| | [Framed-IPv6-Prefix] | ⟩ | IP address |
| | [Address-Realm] | | |
| | [Logical-Access-Id] | ———— | Logical access address |
| | [Physical-Access-ID] | ———— | Physical access address |

Wherein, all these AVPs including [Flow-Description], [Flow-Status], [QoS-Information], [User-Name], [Called-Station-ID], [Framed-IP-Address], [Framed-IPv6-Prefix], [Address-Realm], [Logical-Access-Id] and [Physical-Access-ID] are clearly defined in prior art.

Step S506, If the SCF has provided QoS pre-authorization to the related flow, the PD-FE, after receiving the resource decision request message from the PE-FE, interacts with the SCF so as to obtain the service information of related flow. This step is optional.

Step S508, The PD-FE checks the flow description, the requested QoS resource and the service information to see if they are consistent with the network policy rules in the PD-FE and with the transport layer subscription information in the NACF.

Step S510, Under the condition that the check in Step S508 has passed, the PD-FE determines the access network and the core network required by media flow and interacts with the TRC-FE to check the availability of resources.

Step S512, After Step S508 and Step S510, the PD-FE makes a final admission decision.

Step S514, The PD-FE replies a resource decision response message to the PE-FE, and the message contains the final decision rules. Then, the PE-FE performs policy installation and replies to the CPE through the transport layer signaling.

Example 2

Figure 6:
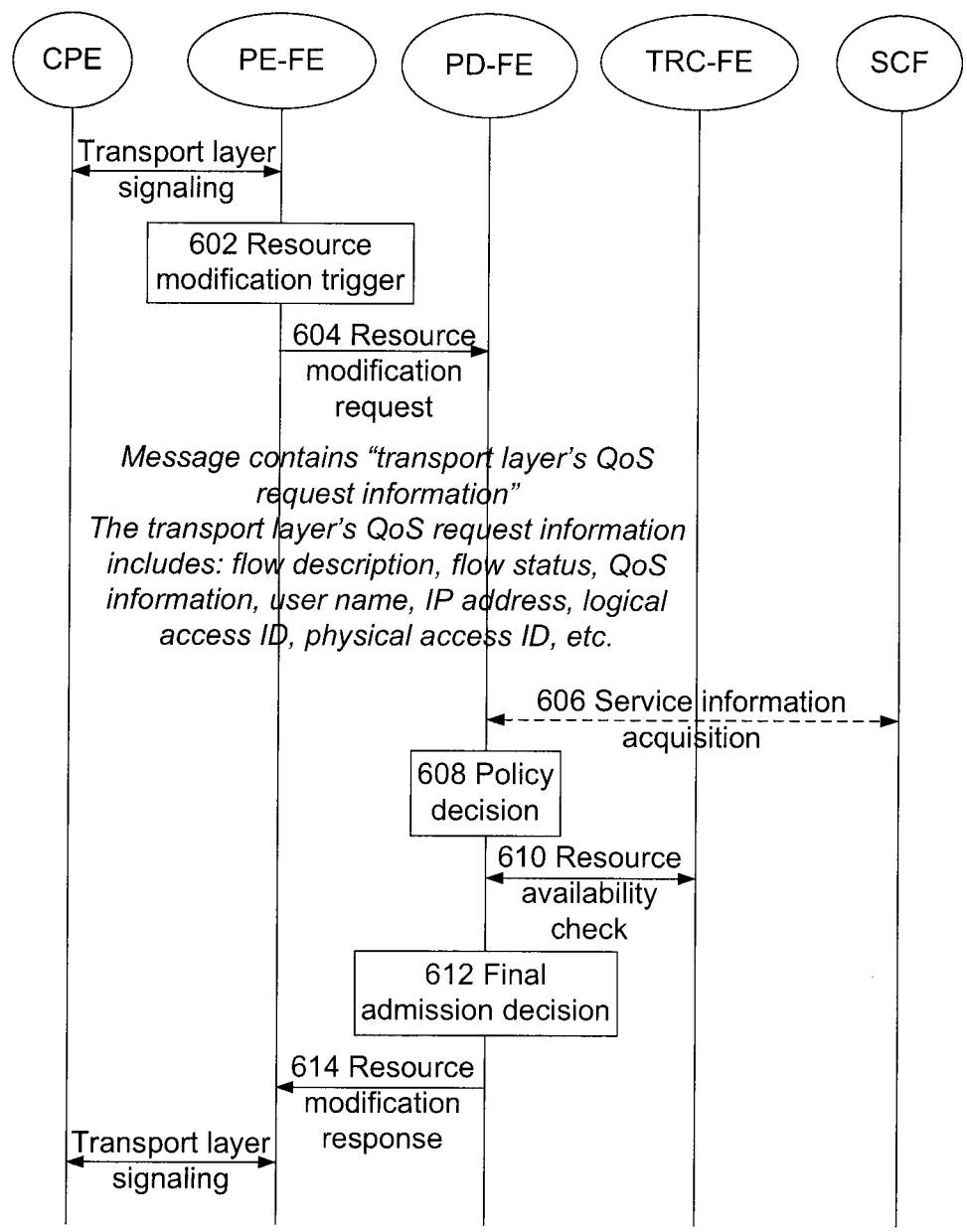
FIG. 6 is the signaling flowchart of Example 2 of the method for implementing the QoS request information according to the embodiments of the present invention.

FIG. 6 shows the resource modification process in the pull mode according to the embodiment of the present invention. The resource modification process includes the following steps (Step S602-Step S614):

Step S602, A transport layer signaling from the CPE triggers the PE-FE to generate a resource decision request so as to modify the required QoS resources for the specified flow.

Step S604, After receiving a QoS request from the CPE, the PE-FE sends the PD-FE a resource decision request message via the Rw interface to request the PD-FE to make an admission control decision. The resource decision request message contains transport layer's QoS request information.

In existing Rw interface protocol, the CCR command can be used by the PE-FE to send resource decision request messages to the PD-FE in the pull mode. Therefore, the transport layer's QoS request information is included in the CCR command. Because the existing Rw interface protocol utilizes the Diameter protocol and object properties are represented in the form of AVP, the CCR command containing transport layer's QoS request information is represented in the following form:

```
<CC-Request> ::=    < Diameter Header : 272, REQ, PXY >
                    < Session -Id >
                    { Auth-Application -Id }
```

-continued

```
                    { Origin -Host }
                    { Origin -Realm }
                    { Destination -Realm }
                    { CC-Request -Type}
                    { CC-Request -Number }
                    *[Traffic -Information ] ———— Trans port layer's
                    QoS request information
                    ... ...
                    *[ AVP ]
```

For easy description, some of the existing AVPs in the CCR command have been omitted, and, each item with a "*" symbol means that there can be multiple such items. In the above mentioned CCR command, a new AVP is defined to represent transport layer's QoS request information and is named [Traffic-Information], whose AVP form is represented as:

```
Traffic-Information :: = <AVP Header: TBD>
(Transmission layer's   * [Flow-Description]       ———      Flow description
QoS request              [Flow-Status]              ———      Flow status
information)             [QoS-Information]          ———      QoS information
                         [User-Name]                ———      User Name
                         [Called-Station-ID]        ———      Layer 2 address
                         [Framed-IP-Address]
                         [Framed-IPv6-Prefix]        >       IP address
                         [Address-Realm]
                         [Logical-Access-Id]        ———      Logical access address
                         [Physical-Access-ID]       ———      Physical access address
```

Step S606, If the SCF has provided QoS pre-authorization to the related flow, the PD-FE, after receiving the resource decision request message from the PE-FE, interacts with the SCF so as to obtain the service information of related flow. This step is optional.

Step S608, The PD-FE checks the flow description, the requested QoS resource and the service information to see if they are consistent with the network policy rules in the PD-FE and with the transport layer subscription information in the NACF.

Step S610, If the check in Step S508 has passed, the PD-FE determines the access network and the core network required by media flow and interacts with the TRC-FE to check the availability of resources.

Step S612, After Step S608 and Step S610, the PD-FE makes a final admission decision.

Step S614, The PD-FE replies a resource decision response message to the PE-FE, and the message contains the final decision rules. Then, the PE-FE performs policy installation and replies to the CPE through the transport layer signaling.

Example 3

Figure 7:
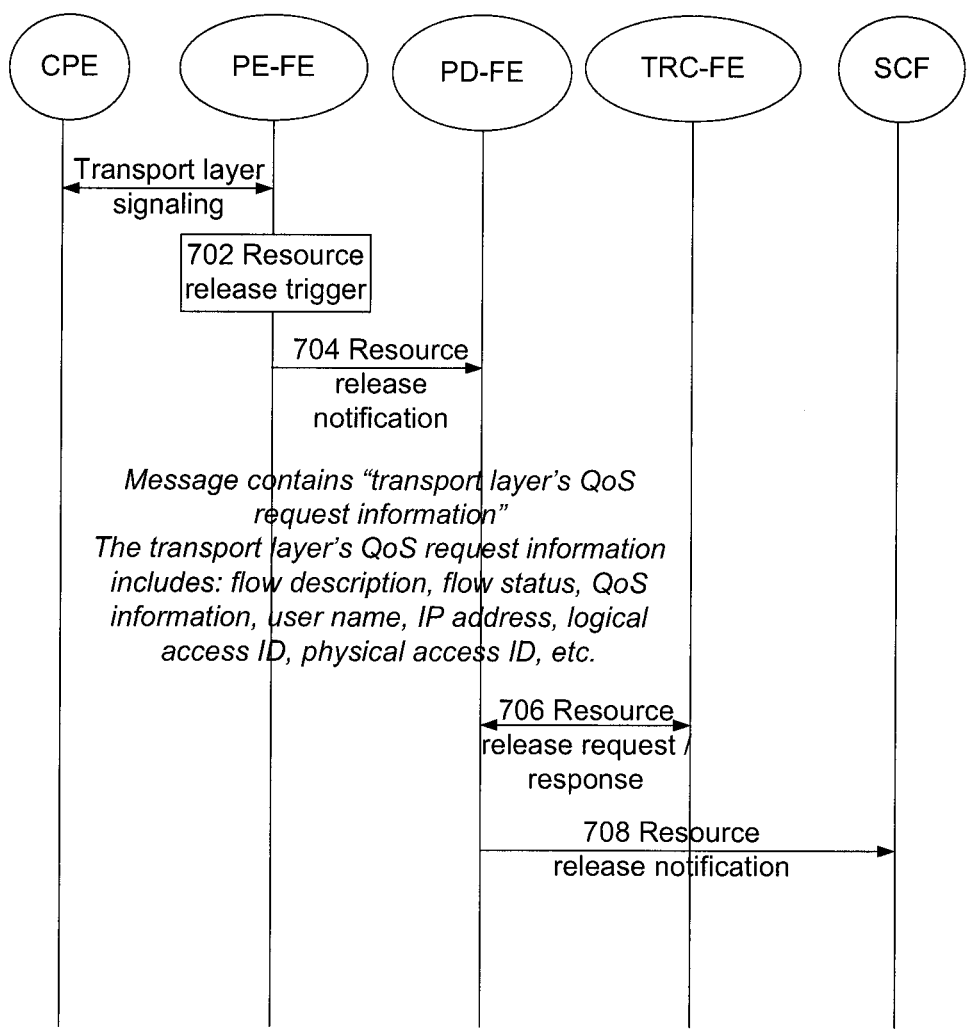
FIG. 7 is the signaling flowchart of Example 3 of the method for implementing the QoS request information according to the embodiments of the present invention.

FIG. 7 shows the resource release process in the pull mode according to the embodiment of the present invention. The resource release process includes the following steps (i.e. Step S702-Step S708):

Step S702, A transport layer signaling from the CPE triggers the PE-FE to generate a resource release notification so as to release the resources occupied by the specified flow.

Step S704, After receiving the QoS request from the CPE, the PE-FE sends the PD-FE a resource release notification via the Rw interface. The resource release notification message contains transport layer's QoS request information.

In existing Rw interface protocol, the CCR command can be used by the PE-FE to send resource release notification messages to the PD-FE in the pull mode. Therefore, the transport layer's QoS request information is included in the CCR command. Because the existing Rw interface protocol utilizes the Diameter protocol and object properties are represented in the form of AVP, the CCR command containing transport layer's QoS request information is represented in the following form:

```
<CC-Request> :: =   < Diameter Header : 272, REQ, PXY >
                    < Session -Id >
                    { Auth-Application -Id }
                    { Origin -Host}
                    { Origin -Realm }
                    { Destination -Realm }
                    { CC-Request -Type}
                    { CC-Request -Number }
                    *[Traffic -Information ] ——— Trans port layer's
                    QoS request information
                    ... ...
                    *[ AVP ]
```

For easy description, some of the existing AVPs in the CCR command have been omitted, and, each item with a "*" symbol means that there can be multiple such items. In the above mentioned CCR command, a new AVP is defined to represent transport layer's QoS request information and is named [Traffic-Information], whose AVP form is represented as:

```
Traffic-Information :: = <AVP Header: TBD>
(Transmission layer's   * [Flow-Description]       ———      Flow description
QoS request              [Flow-Status]              ———      Flow status
information)             [QoS-Information]          ———      QoS information
                         [User-Name]                ———      User Name
                         [Called-Station-ID]        ———      Layer 2 address
                         [Framed-IP-Address]
                         [Framed-IPv6-Prefix]        >       IP address
                         [Address-Realm]
                         [Logical-Access-Id]        ———      Logical access address
                         [Physical-Access-ID]       ———      Physical access address
```

Step S706, The PD-FE sends a resource release request message to the TRC-FE so that the TRC-FE can unload the transmission policy installed on the TRE-FE.

Step S708, The PD-FE notifies the SCF that related resources have been released.

In summary, the technical solution of the present invention can be used to, by defining new parameters, allow the transport layer's QoS request information to be accurately represented so as to implement the resource request process in the pull mode.

The above mentioned are the preferred embodiments of the present invention only and are in no way intended to limit the present invention. For those skilled in the art, the present invention can have various modification and variations. Any and all modifications, equivalent substitutions, and improvements made within the spirit and principle of the present invention are intended to be within the scope of the claims which follow.

What is claimed is:

1. A method for implementing quality of service (QoS) request information, comprising:
    a policy enforcement functional entity (PE-FE) sending a policy decision functional entity (PD-FE) a QoS request message in a form of a Credit Control Request (CCR) command including one or more Traffic-Information attribute-value pairs (AVPs);
    wherein said each Traffic-Information AVP consists of a group of predetermined parameters, and said each group of the predetermined parameters are used to represent the QoS request information of the transport layer for a respective service, and
    wherein said each group of the predetermined parameters include following information: flow description information, flow status information, quality of service information, user name information, Layer 2 address information, IP address information, logical access address information, and physical access address information.

2. The method according to claim 1, wherein the predetermined parameters are applied to an Rw interface of a resource and admission control function and are included in the CCR command of the Rw interface.

3. The method according to claim 1, wherein said or each group of the predetermined parameters further include one or more pieces of flow description information.

4. A packet-to-packet gateway for policy enforcement, comprising:
    a processor, and
    a memory, comprising instructions when executed by the processor, cause the processor to send a QoS request message in a form of a Credit Control Request (CCR) command which includes one or more Traffic-Information attribute-value pairs (AVPs) to a PD-FE,
    wherein said each Traffic-Information AVP consists of a group of predetermined parameters, and said each group of the predetermined parameters are used to represent the QoS request information of the transport layer for a respective service, and
    wherein said each group of the predetermined parameters include following information: flow description information, flow status information, quality of service information, user name information, Layer 2 address information, IP address information, logical access address information, and physical access address information.

5. The packet-to-packet gateway according to claim 4, wherein the predetermined parameters are applied to an Rw interface of a resource and admission control function and are included in the CCR command of the Rw interface.

6. The method according to claim 1, wherein said or each group of the predetermined parameters further include one or more pieces of flow description information.

7. The method according to claim 1, wherein the one or more Traffic-Information AVPs are arranged in continuous fields in the CCR command.

8. The packet-to-packet gateway according to claim 4, wherein the one or more Traffic-Information AVPs are arranged in continuous fields in the CCR command.

* * * * *